Sept. 30, 1958     C. A. ROSENBERGER, JR     2,854,126

CONVEYOR SYSTEM

Filed Jan. 9, 1956     6 Sheets—Sheet 1

Sept. 30, 1958    C. A. ROSENBERGER, JR    2,854,126
CONVEYOR SYSTEM
Filed Jan. 9, 1956    6 Sheets-Sheet 2

Sept. 30, 1958  C. A. ROSENBERGER, JR  2,854,126
CONVEYOR SYSTEM
Filed Jan. 9, 1956  6 Sheets-Sheet 3
Fig. 4.
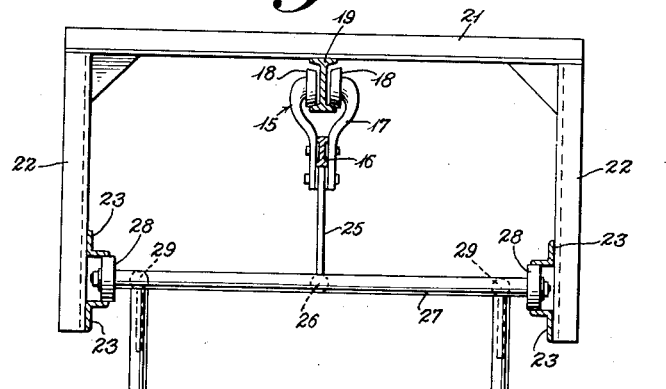
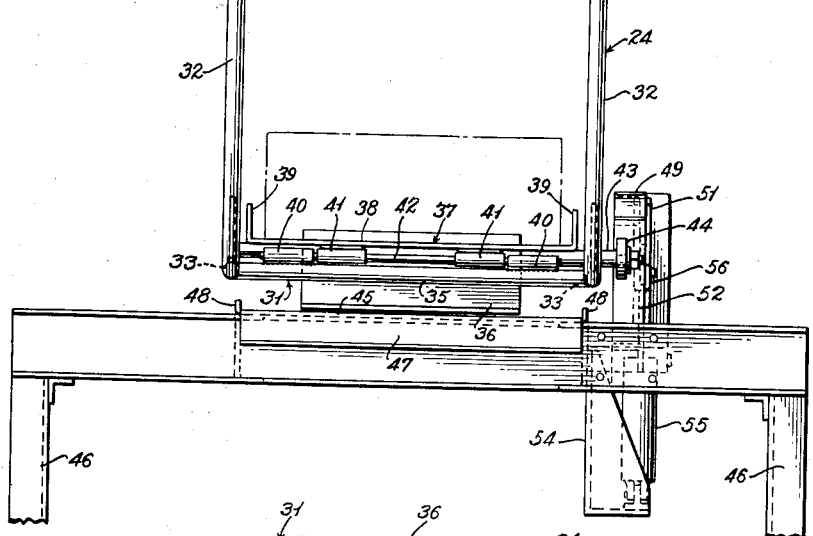
Fig. 5.
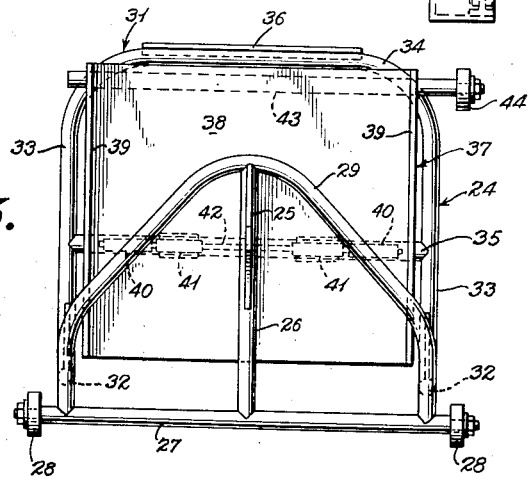

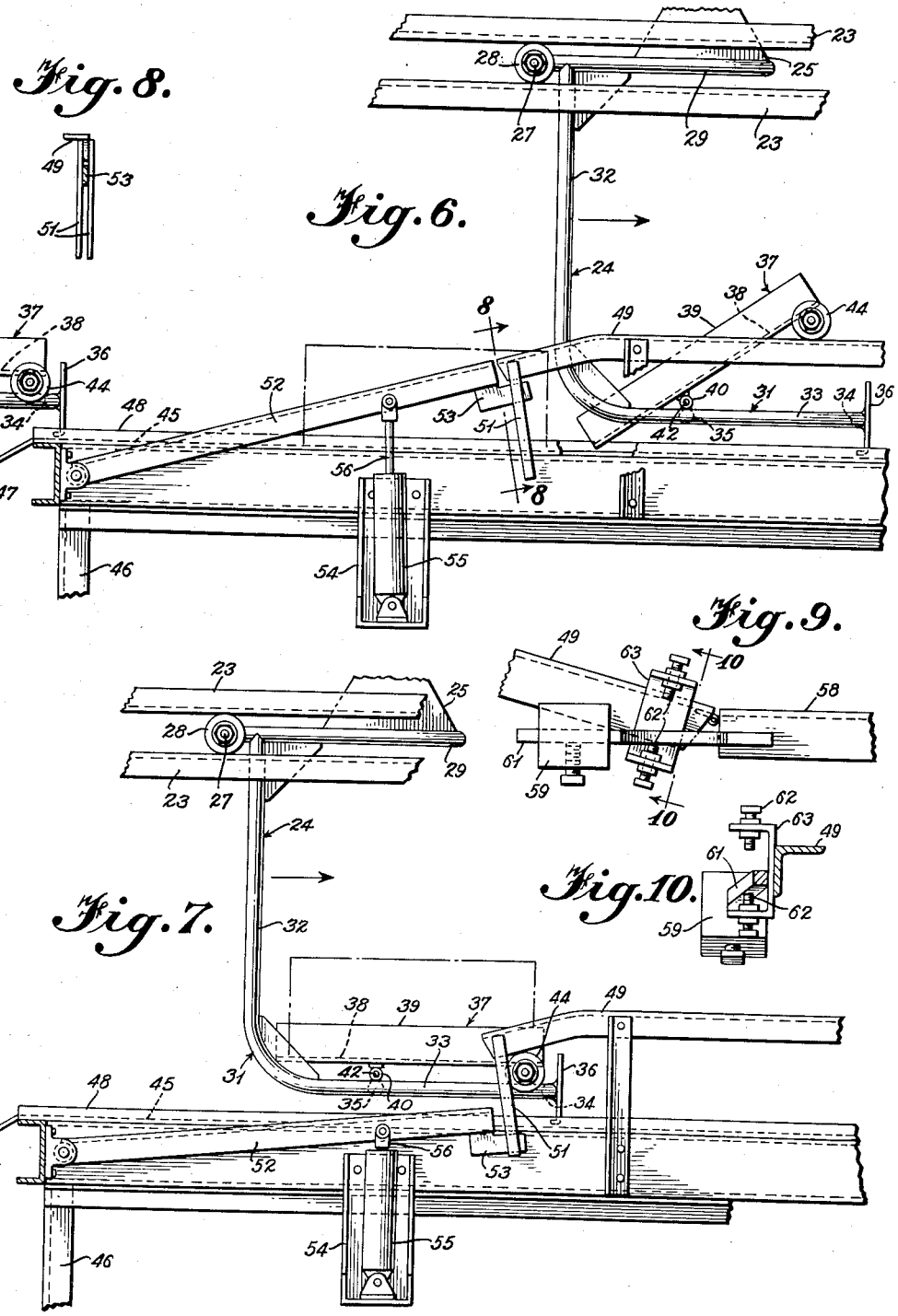

Sept. 30, 1958     C. A. ROSENBERGER, JR     2,854,126
CONVEYOR SYSTEM
Filed Jan. 9, 1956                                                6 Sheets-Sheet 5
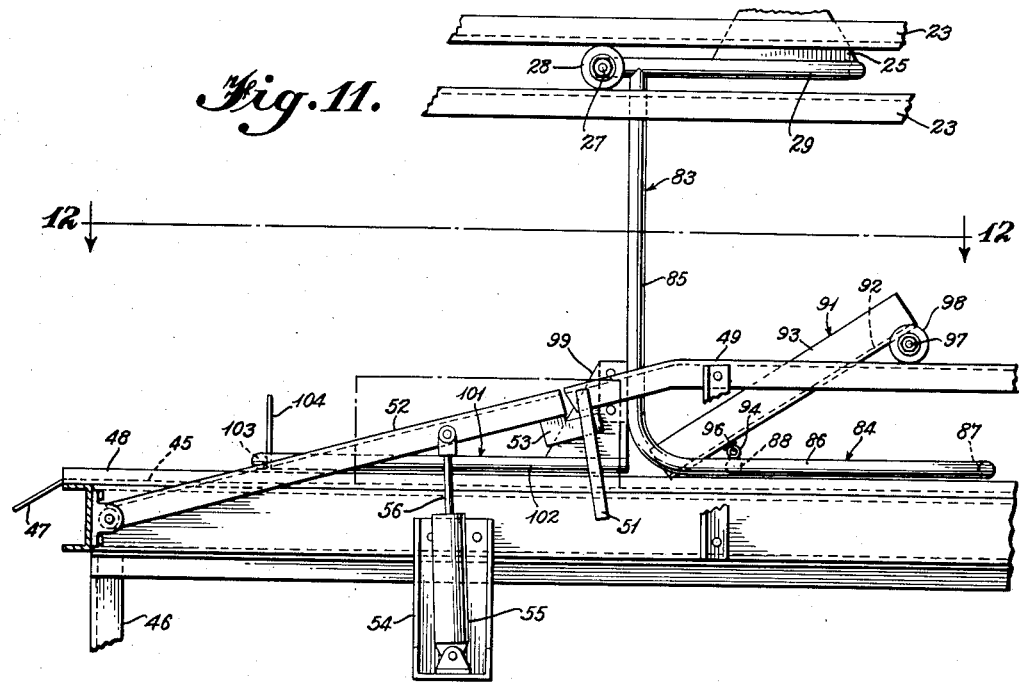
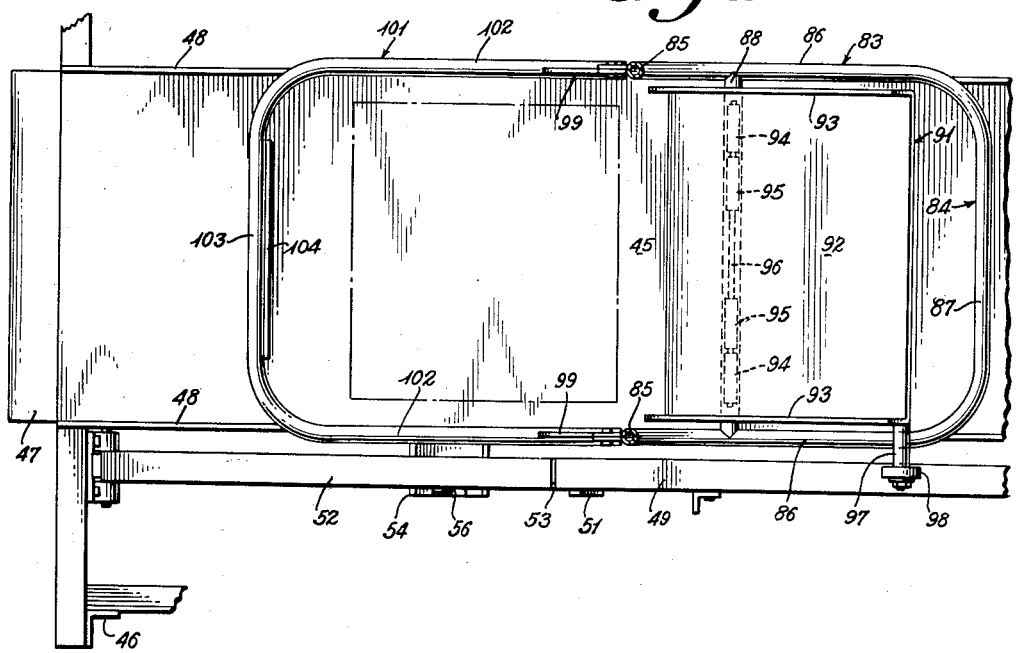

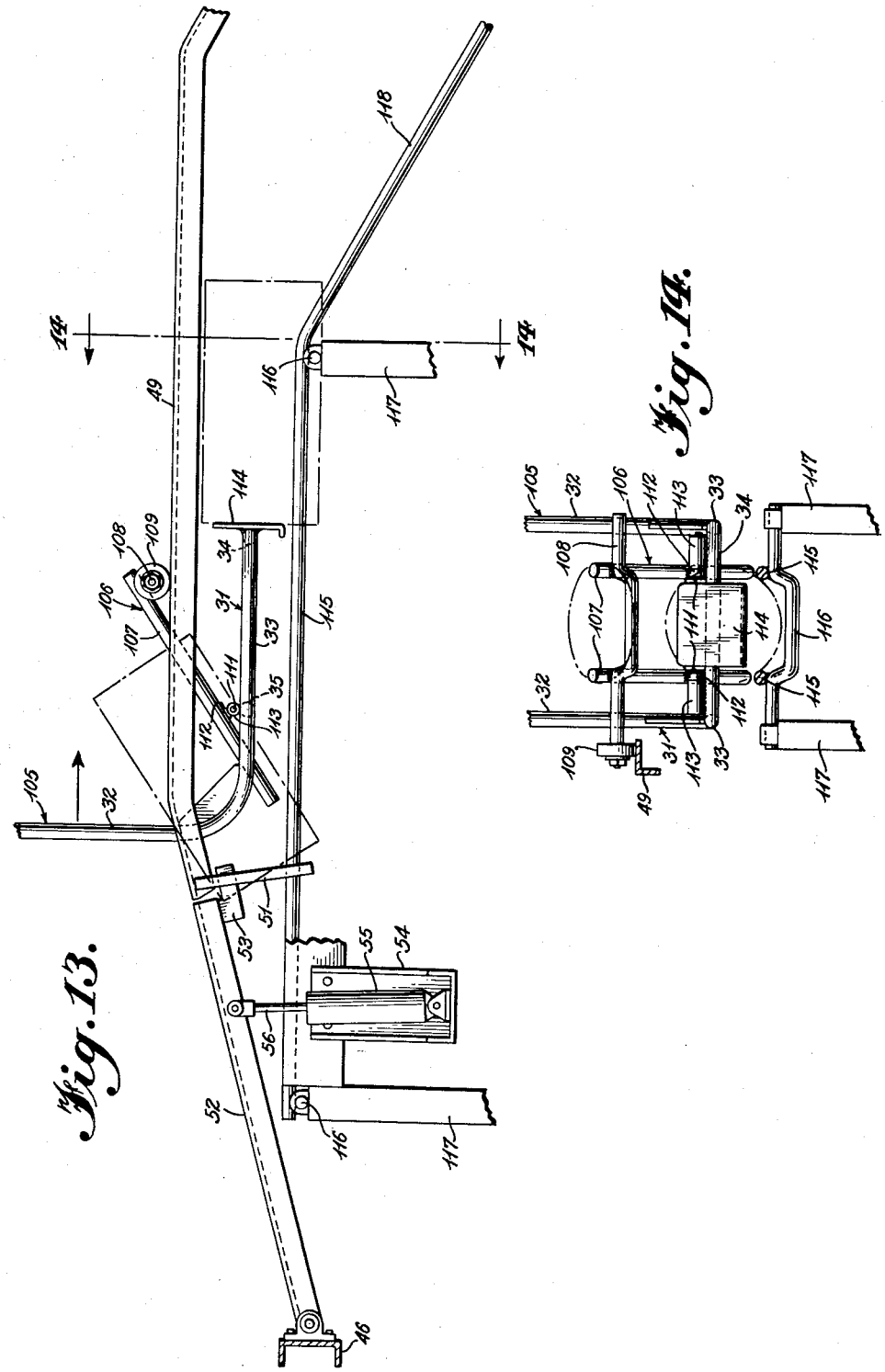

United States Patent Office 2,854,126
Patented Sept. 30, 1958

2,854,126

CONVEYOR SYSTEM

Chester A. Rosenberger, Jr., Perkasie, Pa., assignor to Link-Belt Company, a corporation of Illinois Application January 9, 1956, Serial No. 557,931

17 Claims. (Cl. 198—155)

This invention relates to new and useful improvements in conveyor systems and deals more particularly with article carrier assemblies employed in connection with trolley conveyors and the apparatus employed for discharging and receiving articles from the carrier assemblies.

The primary object of the invention is to provide article carrier assemblies for a trolley conveyor and mechanism for unloading the articles from the carrier assemblies at an unloading station, or for permitting the carrier assemblies to move past the station with the articles thereon, in accordance with the selective operation of the unloading mechanism.

A further important object of the invention is to provide article carrier assemblies for a trolley conveyor which will transport the articles past, or will be tilted to discharge the articles at, an unloading station in accordance with the selective operation of mechanism at the station.

Another important object of the invention is to provide article carrier assemblies for a trolley conveyor which are tiltable to unload the articles therefrom only when the carrier assemblies are moved by the conveyor to engage a selectively positioned tilting device.

Still another important object of the invention is to provide a selectively operable unloading device that is movable between an inoperative position and a position for engaging tiltable trays that are moved thereby to tilt the latter and to unload articles therefrom.

Another object of the invention is to provide an unloading station for the tiltable trays of a trolley conveyor which incorporates mechanism selectively movable between an inoperative position and a position for engaging and tilting the trays to unload the articles therefrom, the articles unloaded from the tilted trays being guided for movement to a selected one of a plurality of points at the station.

Other objects and advantages of the invention will be apparent during the course of the following description.

Figure 1:
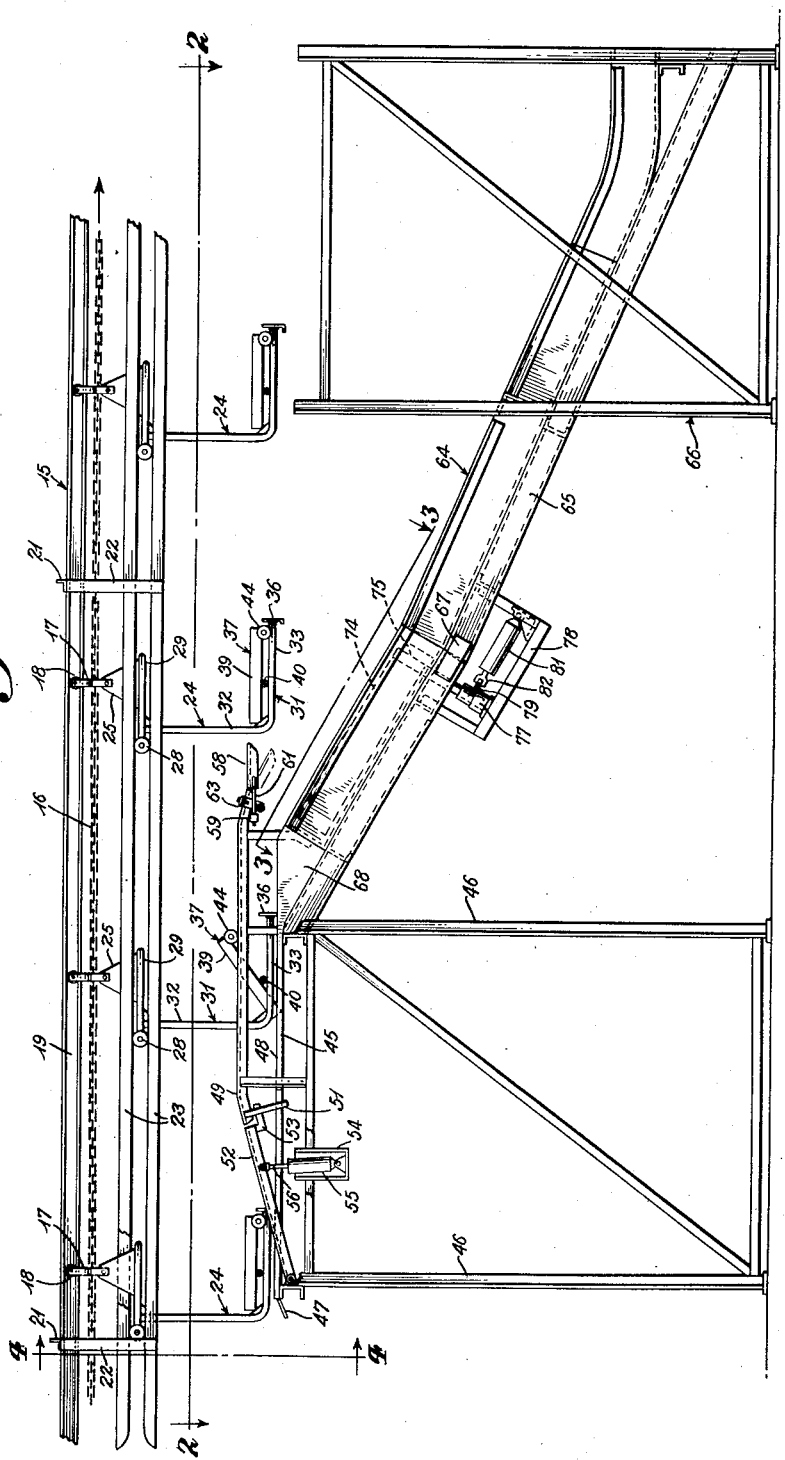
Figure 2:
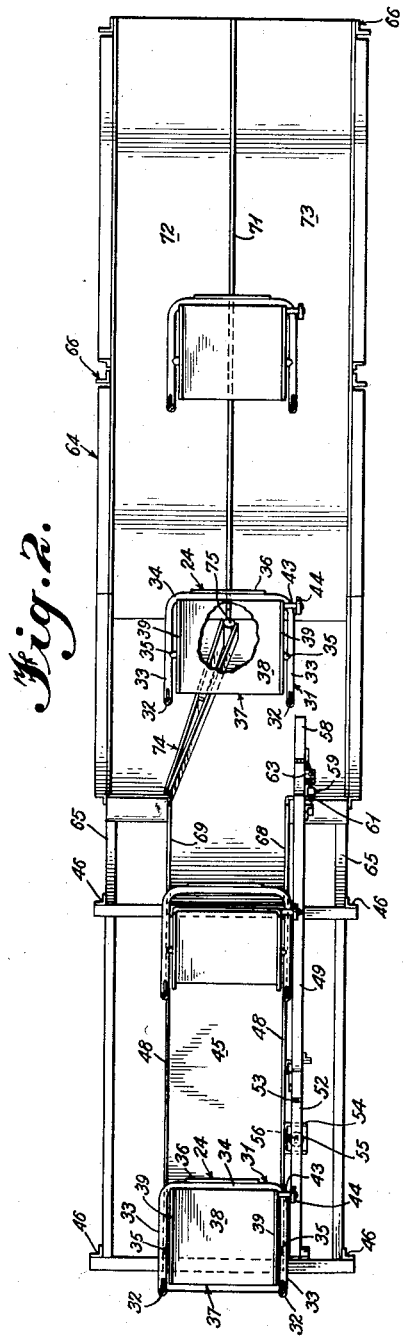
Figure 3:
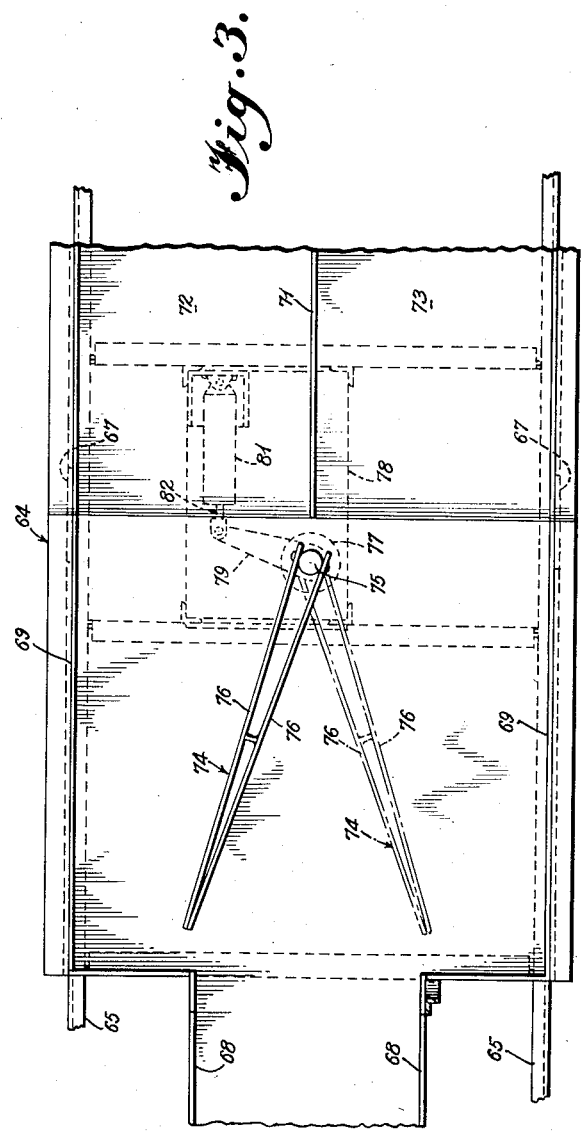

In the accompanying drawings forming a part of this specification and in which like reference characters are employed to designate like parts throughout the same, Figure 1 is a side elevational view of a section of trolley conveyor and an unloading station therefor embodying the invention, Figure 2 is a horizontal sectional view taken on line 2—2 of Fig. 1, Figure 3 is a fragmentary sectional view taken on line 3—3 of Fig. 1, Figure 4 is an enlarged vertical sectional view taken on line 4—4 of Fig. 1, Figure 5 is a top plan view of one of the article carrier assemblies of the conveyor illustrated in Fig. 1, Figure 6 is a fragmentary side elevational view of the device for tilting and unloading the trays of the article carrier assemblies, Figure 7 is a view similar to Fig. 6 but showing the tilting device in its inoperative position, Figure 8 is a fragmentary sectional view taken on line 8—8 of Fig. 6, Figure 9 is a fragmentary side elevational view of the device for gradually returning the tilted trays to their horizontal positions, Figure 10 is a fragmentary sectional view taken on line 10—10 of Fig. 9, Figure 11 is a view similar to Fig. 6 but showing a modified form of article carrier assembly, Figure 12 is a horizontal sectional view taken on line 12—12 of Fig. 11, Figure 13 is a fragmentary side elevational view showing a further modified form of article carrier assembly and a modified structure for receiving articles from the carrier assembly, and Figure 14 is a vertical sectional view taken on line 14—14 of Fig. 13.

In the drawings, wherein for the purpose of illustration are shown the preferred embodiments of the invention, and first particularly referring to Figs. 1 and 4, there is shown a section of a trolley conveyor designated in its entirety by the reference character 15. This conveyor includes an endless chain or traction member 16 that is supported by trolleys 17 at spaced points along its length for movement through an endless path. Each of the trolleys 17 is provided with laterally opposed wheels 18 which are fitted into the channels on opposite sides of an I-beam 19 which functions as a track to guide the rolling movement of the wheels 18 through the path defined by the track. The I-beam 19 is supported in an elevated position in any suitable manner and, as illustrated in Fig. 4, transversely extending members 21 rest upon and are connected at spaced points to the I-beam 19. Depending from each end portion of each transversely extending member 21 is a vertically arranged support 22. Vertically spaced angle members 23 extend between and are connected to the supports 22 at each side of the I-beam 19 to provide longitudinally extending guideways below and on opposite sides of the I-beam for a purpose that will be later described.

Suspended from each of the trolleys 17 is a carrier assembly, designated in its entirety by the reference character 24. As is best illustrated in Figs. 4, 5 and 6, each carrier assembly 24 is provided with a triangular mounting plate 25 the apex of which is connected to the trolley 17 and the base of which is rigidly connected to a longitudinally extending bar 26. This bar projects rearwardly from the plate 25 for connection to the transversely extending axle 27 which has mounted on its opposite end portions guide rollers 28. A reinforcing yoke 29 has its middle portion connected to the leading end of the bar 26 and is bent to position its opposite end portions for connection to the opposite end portions of the axle 27. It will be noted that the plane of the bar 26 and yoke 29 passes midway between the angle members 23 so that the guide rolls 28 will enter the guideways provided by the angle members.

Connected to the yoke 29 adjacent the opposite end portions of the axle 27 is a tubular frame 31 which is bent to provide vertically arranged arms 32 extending downwardly from the yoke 29, horizontally arranged side branches 33 extending forwardly from the lower ends of the vertically arranged arms 32 and a transverse brace 34 which extends between the leading ends of the side branches 33. A transversely arranged member 35 extends between and is rigidly connected to the middle sections of the branches 33. A pusher plate 36 is mounted on the transverse frame brace 34.

Supported for pivotal movement on the carrier assembly frame 31 is a tray 37 that is formed by a plate 38 having upturned flanges 39 at its opposite sides to prevent lateral displacement of articles that are supported on the tray for movement by the carrier assembly 24. As is best illustrated in Fig. 4, the plate 38 is pivotally connected to the frame 31 by laterally spaced pairs of sleeves 40 and 41 which are connected respectively to the transverse member 35 of the frame and to the bottom of the plate 38 and have their bores aligned for receiving the pin 42.

Mounted on the bottom of the plate 38 at the leading edge portion of the tray 37 is a transversely extending axle 43, one end portion of which projects laterally outwardly from the side of the frame 31 and has mounted thereon a follower roll 44 for effecting tilting movement of the tray 37, as will be later described.

Referring once again to Fig. 1 it will be noted that a platform 45 is mounted in a substantially horizontal, elevated position directly beneath the path of movement of the carrier assemblies 24. The platform 45 is supported by suitably reinforced structural members 46 and the end edge of the platform 45 toward which the carrier assemblies 24 approach is provided with a downwardly inclined lip 47. As illustrated in Fig. 4, guide flanges 48 are mounted to extend longitudinally along the opposite sides of the platform 45.

Mounted in a fixed position at one side of the platform 45 is a guide member 49 having a flange which is positioned in vertical alignment with and above the normal path of movement of the follower rolls 44 of the trays 37. Since the pivotal connection between the tray 37 and frame 31 of each carrier assembly 24 is positioned rearwardly of the longitudinal center of the tray, the tray will be urged by its own weight into a position at which the axle 43 will rest upon the frame 31. This position of the tray 37 is referred to as its normal, or load carrying, position and, as illustrated in Fig. 7, the flange of the guide 49 is positioned above the path of movement of the roller 44 when the tray is in its normal position. By reference to Figs. 6 and 7, it will also be noted that a short section at the approach end of the guide member 49 is inclined downwardly and this inclined portion has connected thereto a pair of laterally spaced guides 51, as illustrated in Fig. 8.

Connected to the supporting structure 46 for pivotal movement about a transverse axis adjacent the approach end of the platform 45 is a guide member 52 which is arranged in the vertical plane of the guide member 49. At the end of the guide member 52 opposite its pivotal connection to the supporting structure 46 there is provided a longitudinally extending arm 53 which is positioned between and guided for vertical movement by the guides 51. Mounted on a suitable supporting bracket 54 in the plane of movement of the guide member 52 is a double acting fluid motor 55 having its plunger 56 connected to the member 52 for imparting pivotal movement to the latter. The position of the fluid motor 55 and of the pivotal connection between the guide member 52 and the supporting structure 46 are such that when the plunger 56 of the fluid motor is retracted, the member 52 lies entirely below the normal path of movement of the follower rolls 44. When the plunger 56 of the motor 55 is extended, however, pivotal movement is imparted to the member 52 and this member is positioned in, and in angular relationship with, the normal path of movement of the follower rolls 44 with the upper end portion of the guide member 52 aligned with the downwardly inclined end portion of the guide member 49.

It will be readily apparent, therefore, that when the guide member 52 has been moved by the plunger 56 into its operative position, with its upper end portion aligned with the inclined end of the guide member 49, the follower 44 of the next carrier assembly 24 to approach the guide members 52 and 49 will be deflected by its travel along these two members. This movement of the follower roll 44 will cause the tray 37 associated therewith to be tilted and to discharge articles therefrom onto the platform 45, as illustrated in Fig. 6. The trays 37 of the carrier assemblies 24 moving over the platform 45, therefore, may be selectively discharged by operation of the fluid motor 55 to extend or retract its plunger 56.

The end portion of the guide member 49 opposite the movable guide member 52 has pivotally mounted thereon a guide arm 58 which is urged into a substantially horizontal position above the normal path of movement of the follower rolls 44 by a counterweight 59 which is mounted on an arm 61. Pivotal movement of the guide arm 58 is limited by the adjustable stops 62 carried by the bracket 63 for engagement with the arm 61. The guide arm 58, therefore, is normally supported out of alignment with the follower rolls 44 which are not deflected from their normal path of movement by the guide members 52 and 49. Those follower rolls 44 which are deflected from their normal path of movement by the guide members 52 and 49, however, will pass onto the guide arm 58 and will overcome the effect of the counterweight 59 to cause the arm to pivot into a position for gradually returning the rollers to their normal position on the frame 31. The arm 58, therefore, functions to prevent impact between the trays 37 and their associated frames 31 when the follower rolls 44 of the trays pass off of the end of the stationary guide member 49.

At the discharge end of the platform 45 there is provided an inclined chute designated in its entirety by the reference character 64. This chute rests upon and is supported by stringers 65 the upper end portions of which are connected to the supporting structure 46 for the platform 45 and the lower portions of which are supported by a similar structure 66. It will be noted that each stringer is formed of upper and lower parts which are connected at their adjacent ends by a splice plate 67 that allows for a slight amount of angular relationship between the parts. Because of this angular relationship, the upper portion of the inclined chute 64 is supported at a slightly steeper angle than the lower portion of the chute for a purpose that will be later described.

Adjacent the platform 45, the chute 64 is of substantially the same width as the platform 45 and is provided with sideboards 68. The remainder of the chute 64, however, has its sides displaced laterally outwardly to substantially twice the width of the initial portion of the chute. Sideboards 69 are mounted on both sides of the widened portion of the chute 64 and a partition 71 is mounted to extend longitudinally along the center line of its lower end portion to divide the same into separate branch chutes 72 and 73.

The upper end of the partition 71 terminates in alignment with the junction between the differently inclined upper and lower end portions of the chute 64. A switching gate 74 is mounted on a stub shaft 75 that is supported adjacent the upper end of the partition in normal relationship with the upper end portion of the chute. The gate 74 extends along the supporting surface of the upper end portion of the chute 64 and is formed of two plates 76 which converge upwardly from opposite sides of the stub shaft 75 to a point adjacent the narrower portion of the chute adjacent the platform 45.

The stub shaft 75 is supported for pivotal movement by a journal 77 that is mounted on a base 78 suspended beneath the chute 64 and a crank arm 79 is rigidly connected to the shaft adjacent the journal 77. A double acting fluid motor 81 is also mounted on the base 78 and has its plunger 82 pivotally connected to the outer end of the crank arm 79 for imparting pivotal movement to the shaft 75 when the plunger is reciprocated. It will be readily apparent that retraction of the plunger 82 will move the gate 74 to the position illustrated in full lines in Fig. 3 so that articles moving downwardly from the narrow portion of the chute 64 will be engaged by the gate and deflected into the branch chute 73.

On the other hand, extension of the plunger 82 will move the gate 74 to the position illustrated in broken lines in Fig. 3 and articles moving downwardly from the narrow portion of the chute 64 will be deflected by the gate into the branch chute 72.

The operation of the conveyor system described above will be discussed in detail as follows:

As the carrier assemblies 24 are moved by the traction member 16 to approach the platform 45, the guide rollers 28 will enter the guideways provided by the spaced angle members 23 and the support provided by the trolley 17 and guide rollers 28 will maintain the carrier assemblies in a fixed path of movement as they pass over the platform 45. Preceding the movement of a carrier assembly 24 to be discharged into a position overlying the platform 45, the movable guide member 52 is elevated into the path of movement of the approaching follower roll 44, as illustrated in Fig. 6. If the carrier assembly is not to be discharged, the guide member 52 is left in or moved to its inoperative position out of alignment with the path of movement of the follower roll, as illustrated in Fig. 7.

When the member 52 is in its inoperative position, the follower roll 44 will pass above the guide member 52 and beneath the stationary guide member 49 and guide arm 58 and the tray 37 will remain in its normal, untilted position during movement of the carrier assembly above the platform 45. When the member 52 is raised into the path of movement of the follower roll 44, as illustrated in Fig. 6, the movement of the carrier assembly 24 will cause the follower roll to travel over the inclined guide member 52 and the stationary guide member 49. When so deflected, the follower roll 44 will move its associated tray 37 into a tilted position so that any articles resting on the tray will slide rearwardly therefrom onto the platform 45. Continued movement of the carrier assembly 24 will move the follower roll 44 onto the pivoted guide arm 58 and the weight of the tray 37 will cause the guide arm to pivot into an inclined position at which the follower roll 44 will be gradually returned to its normal path of movement and the tray 37 will be gently repositioned on the frame of the carrier assembly.

Articles discharged from the trays 37 will rest upon the platform 45 until the pusher plate 36 of the next successive carrier assembly 24 is moved into engagement with the same, at which time the articles will be pushed along the platform and into the chute 64. Articles entering the chute 64 will slide down the same into engagement with the switching gate 74 and, in accordance with the selected position of the gate will be deflected into either of the branch chutes 72 or 73 for delivery to the desired station at the bottom of the chute 64. Since the engagement between the gate 74 and the articles deflected thereby will have a retarding action on the gravitational movement of the articles, the upper end portion of the chute 64 is more steeply inclined to assure continued movement of the articles thereover.

It will be readily apparent that each of the carrier assemblies 24 is of identical construction and that any desired number of discharge points for the trays 37 may be provided along the path of movement of the carrier assemblies.

Referring now to Figs. 11 and 12 for a detail description of the modified carrier assembly 83 illustrated therein, it will be noted that this differs from the previously described carrier assemblies 24 only with respect to its frame 84 and the structure supported thereon. The remaining portions of the carrier assembly 83, therefore, have been given the same reference characters as the corresponding portions of the carrier assemblies 24 and will not again be described.

Extending downwardly from the opposite end portions of the yoke 29 are two vertically arranged arms 85 of the tubular frame 84 which is bent forwardly adjacent the platform 45 to provide horizontally arranged side branches 86 which are connected at their leading ends by the transversely arranged brace 87. A transversely arranged member 88 extends between and is connected to the two side branches 86 rearwardly of the longitudinal center of the side portions.

The frame 84 of each carrier assembly 83 is provided with a tray 91 formed of a plate 92, having upturned side flanges 93, and mounted for pivotal movement on the transverse member 88. The pivotal connection between the plate 92 and the transverse member 88 is provided by laterally aligned pairs of sleeves 94 and 95 which are connected, respectively, to the transverse member and to the bottom of the plate 92 for receiving the pin 96 which extends through the aligned bores of the sleeves.

At the leading edge portion of the plate 92 there is provided a transversely extending axle 97, one end portion of which projects laterally outwardly beyond the side of the frame 84 and has mounted thereon a follower roll 98.

Mounted on each of the vertically arranged arms 85 of the frame 84 is a bracket 99 of a pusher yoke 101 having its side branches 102 arranged to extend rearwardly of and aligned with the side branches 86 of the frame 84. A transversely arranged brace 103 extends between and connects the side branches 102 of the yoke 101 at the trailing ends of said side branches and a pusher plate 104 is mounted on and extends vertically upwardly from the transverse brace 103.

The operation of the carrier assembly 83 is similar to that of the carrier assemblies 24, previously described, except that the articles discharged from the trays 91 by the tilting thereof are discharged onto the platform 45 within the space between the side branches 102 and in front of the transversely arranged brace 103 of the pusher yoke 101 so that the pusher plate 104 will engage and push the articles discharged from the trays along the platform 45 to the chute 64. The carrier assembly 83, therefore, does not rely on the movement of a succeeding carrier assembly to push the articles discharged from its tray 91 off of the platform 45 into the chute 64. This type of carrier assembly is particularly adapted for use where the next succeeding carrier assembly is spaced a considerable distance along the traction member 16.

Referring now to Figs. 13 and 14 for a detail description of the modification of the invention illustrated therein, it will be noted that the carrier assembly 105 includes a frame which is identical to the previously described frames 31 of the article carriers 24 and corresponding reference characters have been applied to corresponding parts of the frames of the two carrier assemblies.

The tray 106 of the carrier assembly 105 is formed of a pair of laterally spaced parallel bars 107 which are connected at their leading ends by a transversely extending axle 108, one end portion of which projects laterally outwardly from the frame 31 and has mounted thereon a follower roll 109. The portion of the axle 108 between the bars 107 is downwardly offset for a purpose that will be later described. The bars 107 are pivotally connected to the transversely extending member 35 of the frame 31 by pins 111 which extend through lugs 112 on the lower sides of the bars and into sleeves 113 which are rigidly mounted on the transverse member. A pusher plate 114 is mounted on the middle section of the transversely arranged brace 34 of the frame 31.

It will be readily apparent that the tray 106 is particularly adapted for carrying a cylindrical object which is positioned on the tray with its axis in parallel relationship with the bars 107 and the diameter of which is such that the side of the article will be engaged by the bars.

Positioned directly beneath the paths of movement of the bars 107 are a pair of spaced parallel bars 115 which are supported on transversely extending members 116 which are offset downwardly between the bars 115 to provide clearance for the movement of the cylindrical articles which are supported in a horizontal position on the bars. The transverse members 116 are supported at their opposite end portions by vertically arranged and suitably reinforced supporting structures 117.

The guide members for selectively engaging and deflecting the follower roll 109 from its normal path of movement, and their associated elements, are identical to those of the previously described modifications of the invention, corresponding reference numbers having been applied to the corresponding parts thereof, and this structure will not be again described.

The spaced bars 115 provide a platform for receiving the cylindrical articles discharged from the trays 106 by the tilting of the latter and the pusher plate 114 of the next succeeding carrier assembly 105 will engage and push the articles along the bars to one end of the platform provided thereby. At this end of the platform, the bars 115 are inclined downwardly to provide a chute 118 for the gravitational movement of the articles to a desired position.

The operation of the device illustrated in Figs. 13 and 14 is similar to that of the other modifications of the invention, the principal distinctions being the cylindrical shape of the articles which the trays 106 are particularly adapted to handle, and the modified structure of the platform 115 and chute 118 to accommodate the cylindrical articles carried by the trays 106.

It is to be understood that the forms of this invention herewith shown and described are to be taken as preferred examples of the same and that various changes in the shape, size and arrangement of parts may be resorted to without departing from the spirit of the invention or the scope of the subjoined claims.

Having thus described the invention, I claim:

1. In a conveyor system, an endless traction member supported for travel through an elevated path, a carrier assembly connected to said traction member for movement thereby, said carrier assembly having pivotally mounted means normally occupying a substantially horizontal position for supporting the articles to be conveyed, means mounted adjacent the path of travel of said carrier assembly for movement into and out of a position for engagement by the traveling article supporting means to pivot the latter into a position for discharging the articles therefrom, a platform mounted beneath the path of travel of said carrier assembly at a position to support the articles discharged from said supporting means, means adjacent said platform for receiving the discharged articles, and means mounted on said carrier assembly for engaging articles on the platform and propelling the articles to said receiving means.

2. A conveyor system as defined in claim 1 further characterized by said supporting means having follower mechanism connected thereto in spaced relationship with the pivotal mounting of said supporting means, and said means for pivoting said supporting means comprising a guide member movable into and out of an inclined position in the normal path of movement of said follower means, movement of said guide member into said inclined position causing the follower means to be deflected for pivoting the supporting means to discharge the articles from the latter.

3. A conveyor system as defined in claim 1 further characterized by means for yieldably engaging the pivoted supporting means when the latter moves away from said pivoting means to gradually return the supporting means to its normal horizontal position.

4. A conveyor system as defined in claim 1 further characterized by said article supporting means being pivotally mounted for movement about a transversely extending axis to discharge the articles onto said platform, said platform being positioned at an elevation to support the discharged articles in the path of movement of said article engaging and propelling means, and said receiving means comprising an inclined chute for the gravitational movement of the articles propelled from said platform.

5. A conveyor system as defined in claim 4 further characterized by said chute having its lower end portion divided to provide a plurality of branches, and means mounted on said chute and movable to positions for guiding the gravitational movement of the articles on the chute to a selected one of said branches.

6. In a conveyor system, an endless traction member supported for movement through an elevated path, a carrier assembly connected to said traction member for movement thereby, said carrier assembly having a pivotally mounted tray normally occupying a substantially horizontal position for supporting articles to be conveyed, tilting means movable into and out of a position for engagement by the tray moving therepast to tilt the latter and discharge the articles therefrom, a platform mounted to receive the articles discharged from said tray, and means mounted on said carrier for moving the articles along said platform to one end of the latter.

7. A conveyor system as defined in claim 6 further characterized by a follower mounted on said tray, said tilting means comprising a stationary guide member arranged in vertically spaced relationship with and extending along a portion of the normal path of travel of said follower for supporting the latter in a position to tilt said tray, and a guide member mounted for movement into and out of a position to selectively guide the follower from its normal path onto said stationary guide member.

8. A conveyor system as defined in claim 7 further characterized by a guide arm pivotally mounted on the outer end portion of said stationary guide member for movement into and out of the normal path of the movement of said follower, and means urging said guide arm into a position out of the said normal path of movement of said follower, said follower engaging said guide arm when the follower is moved off of said stationary guide member and effecting pivotal movement of the guide arm against the force of said urging means to gradually return said follower to its normal path of movement.

9. A conveyor system as defined in claim 8 further characterized by said movable guide member being mounted for pivotal movement about one of its end portions into and out of an operative position at which its free end portion is aligned with said one end of said stationary guide member and its middle portion lies in and is inclined relative to the path of movement of said follower, and a fluid motor for selectively moving said guide member between its operative and inoperative positions.

10. A conveyor system as defined in claim 9 further characterized by an inclined chute extending downwardly from said one end of the platform for receiving the articles from the latter and transferring the articles to a selected point.

11. A conveyor system as defined in claim 10 further characterized by said chute having its lower portion divided into a plurality of branches for transferring articles to different points, and a gate mounted on said chute for movement to selected positions to guide the movement of the aricles from the upper end portion of the chute into a selected one of the branches.

12. A conveyor system as defined in claim 10 further characterized by said chute having a longitudinally extending partition mounted in the lower end portion thereof to divide said portion into two branch chutes, a gate supported adjacent the upper end of said partition for pivotal movement of its free end portion into engagement with opposite sides of the chute, and a fluid motor for pivoting said gate to selectively position it for guiding the movement of the articles from the upper portion of the chute ino a selected one of the two branches.

13. In a conveyor system, a carrier assembly suspended for movement through a closed path by an endless traction member, said carrier assembly having a frame, and a tray pivotally connected directly to said frame for rotation about an axis that is fixed relative to said frame, said tray having its center of gravity spaced forwardly of said pivotal connection in the direction of movement of the carrier assembly for urging the tray to partake of rotation in a direction to lower the center of gravity, said frame engaging said tray to normally support the latter in a substantially horizontal position and to permit rotative movement to raise the center of gravity of the tray and to move the latter into a tilted position inclined downwardly and rearwardly.

14. A conveyor system as defined in claim 13 further characterized by said tray comprising a flat plate having its side edges flanged upwardly, and a follower roll mounted on said plate in laterally spaced relationship with the forward edge portion thereof for vertical displacement from its normal path of movement with the carrier assembly to tilt said plate into a downwardly and rearwardly inclined position.

15. A conveyor system as defined in claim 13 further characterized by said tray comprising a pair of laterally spaced parallel bars rigidly connected to said frame.

16. In a conveyor system, a carrier assembly suspended for movement through a closed path by an endless traction member, said carrier assembly having a frame with laterally spaced vertical arms and horizontal branches extending forwardly from the lower end portions of said arms, a transverse brace extending between and connecting the forward end portions of said branches, a transverse member extending between and connecting said branches rearwardly of said brace, a tray pivotally connected to said transverse member with its center of gravity spaced forwardly of said pivotal connection in the direction of movement of the carrier assembly, said frame engaging said tray to normally support the latter in a substantially horizontal position and to permit pivotal movement of the tray into a tilted position inclined downwardly and rearwardly, and a pusher plate mounted in a vertical position on said brace.

17. In a conveyor system, a carrier assembly suspended for movement through a closed path by an endless traction member, said carrier assembly having a frame with laterally spaced vertical arms, a pusher yoke mounted on said frame and having laterally spaced side branches extending rearwardly from the lower end portions of said vertical arms and a brace extending transversely between and connecting the rearward end portions of the side branches, a pusher plate mounted in a vertical position on the transverse brace of said yoke, and a tray pivotally connected to said frame with its center of gravity spaced forwardly of said pivotal connection in the direction of movement of the carrier assembly, said frame engaging said tray to normally support the latter in a substantially horizontal position and to permit pivotal movement of the tray into a tilted position inclined downwardly and rearwardly.

References Cited in the file of this patent

UNITED STATES PATENTS

| | | |
|---|---|---|
| 760,524 | Crossley | May 24, 1904 |
| 2,007,044 | Francis | July 2, 1935 |
| 2,681,727 | Dersch | June 22, 1954 |

UNITED STATES PATENT OFFICE
CERTIFICATE OF CORRECTION

Patent No. 2,854,126                                                      September 30, 1958

Chester A. Rosenberger, Jr.

It is hereby certified that error appears in the printed specification of the above numbered patent requiring correction and that the said Letters Patent should read as corrected below.

Column 9, line 23, claim 15, after "to" insert -- each other and pivotally connected to --.

Signed and sealed this 30th day of December 1958.

(SEAL)

Attest:

KARL H. AXLINE                                                 ROBERT C. WATSON
Attesting Officer                                            Commissioner of Patents